United States Patent [19]

Giovachini et al.

[11] 4,116,088
[45] Sep. 26, 1978

[54] COMPOSITE WHEEL STRUCTURE CAPABLE OF WITHSTANDING LARGE CENTRIFUGAL FORCES

[75] Inventors: Jean-Luc Giovachini, Paris, France; Dante Marc Vendramini, Asnieres, Hauts de Seine, France

[73] Assignees: Institute de Recherche des Transports, Arcueil; Dante Marc Vendramini, Asnieres, both of France

[21] Appl. No.: 711,567

[22] Filed: Aug. 4, 1976

[30] Foreign Application Priority Data

Aug. 5, 1975 [FR] France .................................. 75 24426

[51] Int. Cl.² ............................................. F16C 15/00
[52] U.S. Cl. ..................................... 74/572; 74/230.2
[58] Field of Search .................. 74/230.18, 230.2, 572, 74/573 R, 573 F, 574

[56] References Cited

U.S. PATENT DOCUMENTS 404,796 6/1889 Pettengill ......................... 74/230.18

FOREIGN PATENT DOCUMENTS 3,114 of 1902 United Kingdom .................. 74/230.20

*Primary Examiner*—Stephen C. Bentley

*Attorney, Agent, or Firm*—Karl W. Flocks

[57] ABSTRACT

The invention relates to a composite wheel capable of withstanding large centrifugal forces, including at least two elements made of materials with different yield strengths, one of said elements being peripheral and the other element connecting said peripheral element to the wheel hub, characterized in that said element connecting the peripheral element to the hub comprises two conical flanges having their concave sides facing each other, means being provided to vary the angle subtended by the flanges whereby to obtain, as necessary, either a limitation of the stresses exerted on the material forming the flanges (the diameter of the wheel remaining constant and the angle between flanges widening), or an accompaniment by said flanges of the expansion undergone by the peripheral material (the wheel diameter increasing and the inter-flange angle widening or narrowing).

A composite wheel according to this invention may be used with advantage but by no means exclusively as a test wheel for an eddy-current machine, a linear motor, a brake, or magnets for providing magnetic lift. Alternatively, it may be used as a high energy storage wheel for a variety of vehicles.

12 Claims, 5 Drawing Figures

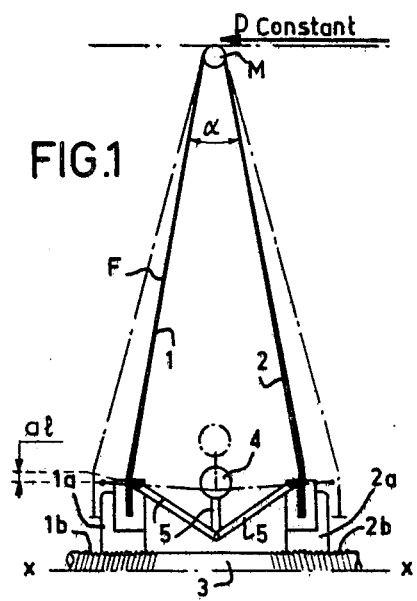
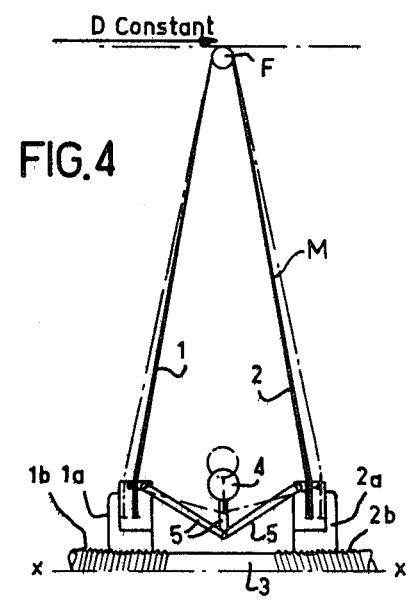
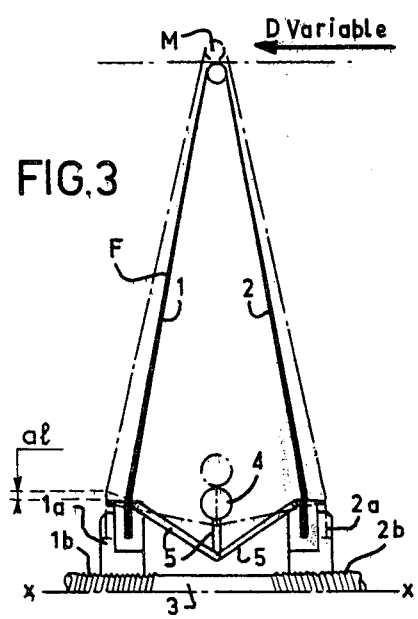
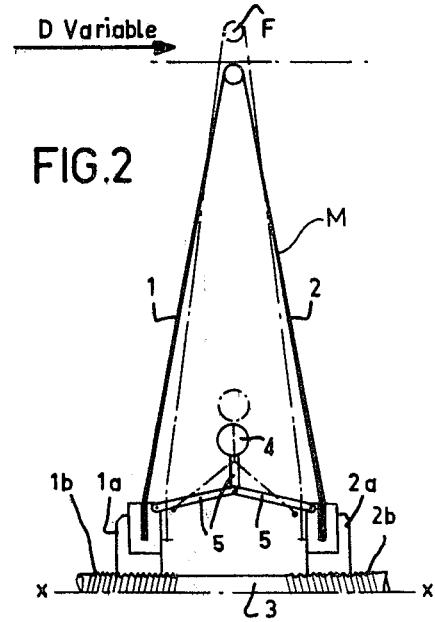
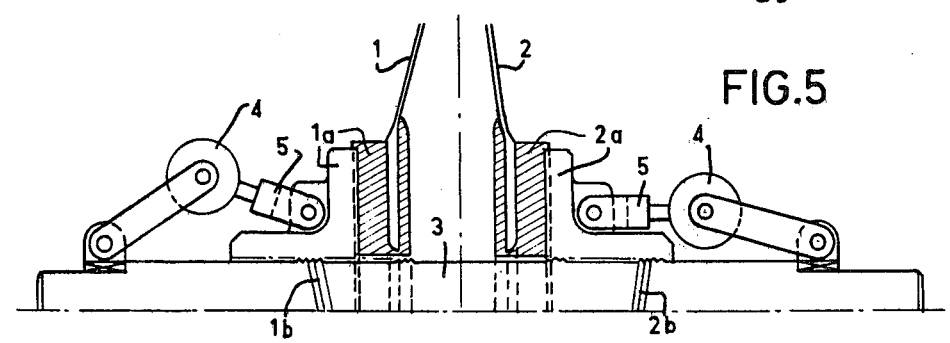

4,116,088

COMPOSITE WHEEL STRUCTURE CAPABLE OF WITHSTANDING LARGE CENTRIFUGAL FORCES

This invention relates to composite wheel structures capable of withstanding large centrifugal forces.

Many fibres are available on the market with excellent strength properties which make them suitable as basic materials for the construction of wheels subjected to large centrifugal forces.

It is sometimes useful to construct composite metal-fibre wheels, in such manner for example that there be at least one circumference common to the two materials. In the absence of special features such as expansion voids, corrugations or the like, which are always difficult to carry out, preventing separation of the two materials accordingly led either to limit the stresses in the stronger material or to irreversibly exceed the yield strength of the other material. These two hypotheses inevitably lead to mediocre, if not useless, structures.

Particularly known is an energy storage flywheel in the form of a bicycle wheel having two sets of spokes which connect an expansible rim (of wound piano wire) to a hub formed by two concentric sleeves, themselves interconnected by elastic means. One set of spokes is connected to one of the sleeves and the other set of spokes to the other sleeve. When the rim expands, the two sets of spokes tend to cause the sleeves to rotate in opposite directions countered by the elastic means. The stresses in the spokes are partly limited by the mutual rotation of the two sleeves.

Such a flywheel lacks strength because of the means used in its construction: conventional spokes secured in no less conventional manner to the rim and to the two-part hub, and coil springs interconnecting these two hub parts. This is a serious drawback for a wheel liable to be subjected to large centrifugal forces.

In a different order of ideas, also known is a hollow wheel in elastic material for variable drives, set under pressure with a conter-wheel. An axial compression exerted on the elastic wheel causes its diameter to increase whereby to effect contact with the counter-wheel under elastic pressure. Driven hubs provide the axial compression of the elastic wheel.

Still in the field of variable drives, also known is a variable-diameter pulley for flat drive belts, with pivotal spokes connecting a deformable rim in crossbraced flexible lathing to driven hubs which screw into threaded portions (left-hand thread, right-hand thread) of a shaft, or formed by rubber blocks which are more or less compressed between flanges fast with the hubs.

In both these variable drives, a powered axial compression causes a desired change in the diameter of a wheel or pulley, whereas in a wheel subjected to large centrifugal forces any peripheral expansion of the wheel is to be taken into account.

Lastly, also known is another type of variable drive by deliberate variation of the diameter of a pulley having a split rim connected by arms to two hubs -one of them fixed and the other movable- two of which arms are connected to the fixed hub and carry fly-balls subjected to centrifugal force. The angle subtended by two arms at the hinge point on the rim tends to close as centrifugal force increases and the diameter of the pulley increases.

The present invention relates to a composite wheel capable of withstanding large centrifugal forces, comprising at least two elements made of materials having different yield strengths, one of said elements being peripheral and the other element connecting said peripheral element to the wheel hub, characterized in that said element connecting the peripheral element to the hub includes two conical flanges having their concave sides facing each other, means being provided to vary the angle formed between the flanges in order to obtain, as the case may be, either a limitation of the stresses exerted on the material forming the flanges (constant wheel iameter an opening angle between the flanges) or an accompanying of the expansion of the peripheral material by said flanges (the diameter of the wheel increasing and the inter-flange angle opening or closing).

In a preferred form of embodiment, the means for varying the inter-flange angle operate by varying the distance between the flanges, substantially at the level of the wheel rotation axis (the distance increasing for a constant wheel diameter: the distance increasing or decreasing for a wheel diameter increasing).

The description which follows with reference to the accompanying non-limitative exemplary drawing will give a clear understanding of how the invention can be carried into practice.

Referring to the drawing:

FIGS. 1 to 4 diagrammatically illustrate, in radial section, one half of each of four composite wheels according to the invention; and FIG. 5 is a fragmental corresponding illustration of an alternative embodiment of a wheel according to the invention For greater clarity, the letter F will be used to designate the material possessing the greater yield strength and the letter M the other material.

Problems relating to composite wheel structures can be considered under two simple cases:

Case I: M is at the periphery an F is inwardly located to connect M to the hub (FIG. 1);

Case II: F is at the periphery and M is located inwardly to connect F to the hub (FIG. 2); (D being the common diameter).

Case I: assume that F fills all the portion circumscribed by the circle of diameter D and that the problem of stress distribution at the interface has been resolved. If F is subjected to a uniform radial stress R, the elongation in the diameter D will be $D \times A_f$, where $A_f$ is the maximum elastic elongation.

The invention then consists in providing for F to be distributed between two conical flanges with facing concave sides and for causing the angle $\alpha$ subtended by them to vary with the rotation speed.

Variation of the angle is obtained by varying the distance between the flanges, substantially level with the wheel rotation axis X—X.

In the case under consideration, the variation is an increase in the distance in question, as the rotation speed of the wheel increases, by an amount $d$ such that the elongation al of each flange responsively to centrifugal force take place without change in the diameter D. When F reaches the maximum stress, the relation $d = 2D(A_f)^{\frac{1}{2}}$ is substantially true assuming the vertex angle of the two flanges to remain small.

Thus M is no longer subject to the drawbacks of undue expansion of the connecting diameter D.

CASE II: Assume the opposite situation in which F is the binding hoop for the inwardly located material M.

In the absence of a compensating feature, and assuming that the stresses are nil when the wheel is at rest, the binding force does not increase quickly enough with the rotation speed.

If however, in accordance with this invention, M is in the form of two conical flanges separated by a gap $d$ level with the rotation axis of the wheel when same is at rest, and if suitable means are provided to reduce this gap as the rotation speed increases in such manner that it be eliminated, say, for a certain rotation speed $v$, while retaining the aforesaid relation $d = 2D(A_f)^{\frac{1}{2}}$, then the maximum binding force will have been obtained for the speed $v$. If M is so arranged (radially) that no tangential stresses can develop therein, then the arrangement will have made it possible to "follow" the expansion of F without subjecting M to an incompatible elongation.

Consideration may also be given to the following two subsidiary cases:

CASE Ia (FIG. 3): F is located inwardly and "follows" the expansion of M through an increase in the distance between the two F-flanges level with the wheel axis.

CASE IIa (FIG. 4): A variation, at wheel axis level, of the distance between the two M-flanges, M being inwardly located, enables the diameter D to be maintained constant.

In Cases I and IIa the diameter D remains constant. In Cases II and Ia the diameter D is variable.

The variation (increase or decrease) in the distance between the two flanges 1 and 2 (of F or M) can be obtained either automatically or deliberately by an operator.

In either case, each of flanges 1 and 2 is mounted on a separate translatable hub member (1a or 2a) which is threaded internally an engages with a matching threaded shaft portion (1b or 2b) coaxial with the wheel axis X—X and mounted for rotation about its axis.

Preferably but by no means necessarily, the shaft portion associated to a flange hub member is fast with the shaft portion associated to the hub member of the other flange, and the whole forms a screw 3 with reverse threads, since the screw-thread on one shaft portion is necessarily opposite to the screw-thread on the other shaft portion, since the flanges must move towards or away from each other in opposite directions.

In the version subjected to action by an operator, the latter acts, through the agency of suitable means (not shown), on each of the threaded shaft portions 1a—2a or on reverse-threa screw 3.

In the automatic version, centrifugal force is effective in splaying at least one fly-mass 4 which drives the two hub members 1a and 2a to which it is connected through links 5.

In FIGS. 1 through 4, the fly-masses 4 are located inside the wheel between the two layers 1 an 2 (of F or M).

In the embodiment shown in FIG. 5, the flymasses 4 are located externally, on either side of the wheel.

Taking for exemplary purposes an elongation of 3% for F and 1% for M, the following compensations will be obtained:

+ 3% in Case I (FIG. 1), with a constant diameter:
− 2% in Case II (FIG. 2), with a variable diameter:
+ 2% in Case Ia (FIG. 3), with a variable diameter:
+ 1% in Case IIa (FIG. 4), with a constant diameter.

A composite wheel according to this invention may be used with advantage but by no means exclusively as a test wheel for an eddy-current machine, a linear motor, a brake, or magnets for providing magnetic lift.

Alternatively, it may be used as a high energy storage wheel for a variety of vehicles.

It goes without saying that changes an subsititutions of parts may be made in the embodiments hereinbefore described without departing from the scope of the invention, as set forth in the appended claims.

We claim:

1. A composite wheel with a hub, capable of withstanding large centrifugal forces, comprising at least two elements made of materials with different yield strengths, one of said elements being peripheral; the other of said elements connecting said peripheral element to said hub and being formed by two conical flanges having their concave sides facing each other and forming an angle therebetween; and means being provided to vary said angle to obtain a limitation of the stresses in said flanges with the diameter of said wheel remaining constant and said angle widening.

2. A wheel as claimed in claim 1, in which said means for varying said angle are automatic.

3. A wheel as claimed in claim 1, in which said means for varying said angle are controllable by an operator.

4. A composite wheel with a hub and a shaft, capable of withstanding large centrifugal forces, comprising at least two elements made of materials with different yield strengths, one of said elements being peripheral; the other of said elements connecting said peripheral element to said hub and being formed by two conical flanges having their concave sides facing each other and subtending an angle therebetween and being separated by a distance substantially level with said shafts;

means being provided to vary said angle by causing a change in said distance including an increase in said distance for a constant diameter of said wheel an a change in said distance for an increasing diameter of said wheel to obtain a limitation of the stresses in said flanges with the diameter of said wheel remaining constant and said angle widening, said means including two separate translatable members of said hub, each of said members having one of the said two flanges mounted thereon.

5. A wheel as claimed in claim 4, including threaded shaft portions capable of rotating about their axes, each of said separate hub members being internally threaded and engaging with one of said threaded shaft portions.

6. A wheel as claimed in claim 4, comprising a screw having two oppositely threaded portions, each of said internally threaded separate hub members engaging with one of said screw portion.

7. A wheel as claimed in claim 4, in which at least one fly-mass responsive to centrifugal force is connected to said separate hub members.

8. A wheel as claimed in claim 1, characterized in that it forms a high energy storage wheel.

9. A composite wheel with a hub and a shaft, capable of withstanding large centrifugal forces, comprising at least two elements made of materials with different yield strengths, one of said elements being peripheral; the other of said elements connecting said peripheral element to said hub an being formed by two conical flanges having their concave sides facing each other and subtending an angle therebetween an being separated by a distance substantially level with said shaft; means being provided to vary said angle by causing a change in said distance including an increase in said distance for a constant diameter of said wheel and a change in said distance for an increasing diameter of said wheel to obtain an accompaniment by said flanges of the expansion in said peripheral element with the diameter of said wheel increasing and said angle changing, said means including two separate translatable members of said hub, each of said members having one of the said two flanges mounted thereon.

10. A wheel as claimed in claim 9, including threaded shaft portions capable of rotating about their axes, each of said separate hub members being internally threaded and engaging with one of said threaded shaft portions.

11. A wheel as claimed in claim 9, comprising a screw having two oppositely threaded portions, each of said internally threaded separate hub members engaging with one of said screw portion.

12. A wheel as claimed in claim 9, in which at least one fly-mass responsive to centrifugal force is connected to said separate hub members.

* * * * *